US006962107B1

(12) United States Patent
Yang

(10) Patent No.: US 6,962,107 B1
(45) Date of Patent: Nov. 8, 2005

(54) JUICER

(75) Inventor: Chih-Chang Yang, Taoyuan (TW)

(73) Assignee: Lidashi Industry Co., Ltd., Taoyuan (TW)

( * ) Notice: Subject to any disclaimer, the term of this patent is extended or adjusted under 35 U.S.C. 154(b) by 0 days.

(21) Appl. No.: 10/928,165

(22) Filed: Aug. 30, 2004

(51) Int. Cl.[7] ............................ A23L 1/00; A23N 1/00; A23N 1/02; A47J 43/046; A47J 43/07

(52) U.S. Cl. ............................ 99/492; 99/511; 99/513

(58) Field of Search .................. 99/348, 492, 509–513, 99/485, 495; 366/205, 206, 96–98, 197, 199, 366/314, 315, 342, 343; 241/282.1, 282.2, 241/282.5, 292.1, 199.12, 37.5, 92, 285.1, 241/285.2; 426/518, 519; 403/206, 300

(56) References Cited

U.S. PATENT DOCUMENTS

| | | | | |
|---|---|---|---|---|
| 5,257,575 | A * | 11/1993 | Harrison et al. | 99/511 |
| 5,355,784 | A * | 10/1994 | Franklin et al. | 99/492 |
| 5,421,248 | A * | 6/1995 | Hsu | 99/512 |
| 5,454,299 | A * | 10/1995 | Gonneaud | 99/492 |
| 6,766,731 | B1 * | 7/2004 | Lavi et al. | 99/492 |
| 6,813,997 | B1 * | 11/2004 | Lin | 99/511 |

* cited by examiner

*Primary Examiner*—Timothy F. Simone
(74) *Attorney, Agent, or Firm*—Bacon & Thomas PLLC

(57) ABSTRACT

The rotary shaft of a juicer motor is braked by engaging an arch-shaped braking piece against the peripheral sidewall of a circular block that is mounted on the rotary shaft exteriorly of the motor shell for simultaneous rotation with the rotary shaft.

9 Claims, 7 Drawing Sheets

JUICER

BACKGROUND OF THE INVENTION

1. Field of the Invention

The present invention relates generally to juicers, and more particularly to a juicer having a brake.

2. Description of the Related Art

Referring to FIGS. 5–7, a conventional fruit and vegetable juicer 90 is comprised of a housing base 91, a motor 92, a razor (not shown), a cooling fan 94, a rotary shaft 93, a linkage 95, a spring 98, and an actuating bar 99. The motor 92 is mounted inside the housing base 91. The rotary shaft 93 is connected with the razor (not shown) and the cooling fan 94, having two ends extending outwards. The linkage 95 is pivotally mounted at a bottom side of the motor 92 for pivotal movement between a first position and a second position, having a brake 96 extending into the motor 92 and a braking piece 97 mounted on the brake 96 and approaching the rotary shaft 93. When the linkage 95 is moved to the second position, the braking piece 97 works on the rotary shaft 93. The spring 98 is mounted between the linkage 95 and the motor 92 for generating resilience, which drives the linkage 95 to pivot towards the second position. The actuating bar 99 is pivotally mounted on the housing base 91, having an end 991 either engaging a side of the linkage 95 to keep the linkage 95 at the first position or being moved away from the linkage 95 to enable the spring 99 to drive the linkage 95 to move to the second position where the braking piece 97 works on the rotary shaft 93 of the motor 92 to stop the rotation of the rotary shaft 93.

However, because the current juicer is gradually structurally miniaturized and its motor is gradually upgraded to a high-power motor, the linkage 95 of the aforementioned juicer 90 takes much more time to frictionally stop the rotary shaft 93, thereby failing to effectively brake the high-power motor 92.

SUMMARY OF THE INVENTION

The primary objective of the present invention is to provide an improved juicer, which can quickly stop the rotation of a rotary shaft of its motor.

The foregoing objective of the present invention is attained by the improved juicer, which is comprised of a housing base, a motor, a circular block, a linkage, a springy member, and an actuating member. The housing base includes a space inside and at least one pivoting seat located in the space. The motor is mounted inside the space of the housing base, having a shell and a rotary shaft, which has two ends running respectively through a top side and a bottom side of the shell. The circular block has an axial hole for running through by the rotary shaft. The linkage is pivotably mounted on the bottom side of the shell of the motor for pivotal movement between a first position and a second position, having a braking piece and a driven portion. The braking piece is located at a side of the linkage for frictionally engaging against the circular block while the linkage is located at the second position. The springy member has two ends connected respectively with the linkage and the shell of the motor for generating resilience that drives the linkage to move towards the second position. The actuating member includes a driving bar extending into the shell of the motor and located on the pivoting seat for pushing against the driven portion of the linkage to keep the linkage at the first position, and is pivotable relatively to the shell of the motor for disengaging the driving bar away from the driven portion. Therefore, the linkage can be moved to the second position by the resilience of the springy member to brake the rotary shaft of the motor.

DETAILED DESCRIPTION OF PREFERRED EMBODIMENTS

Figure 1:
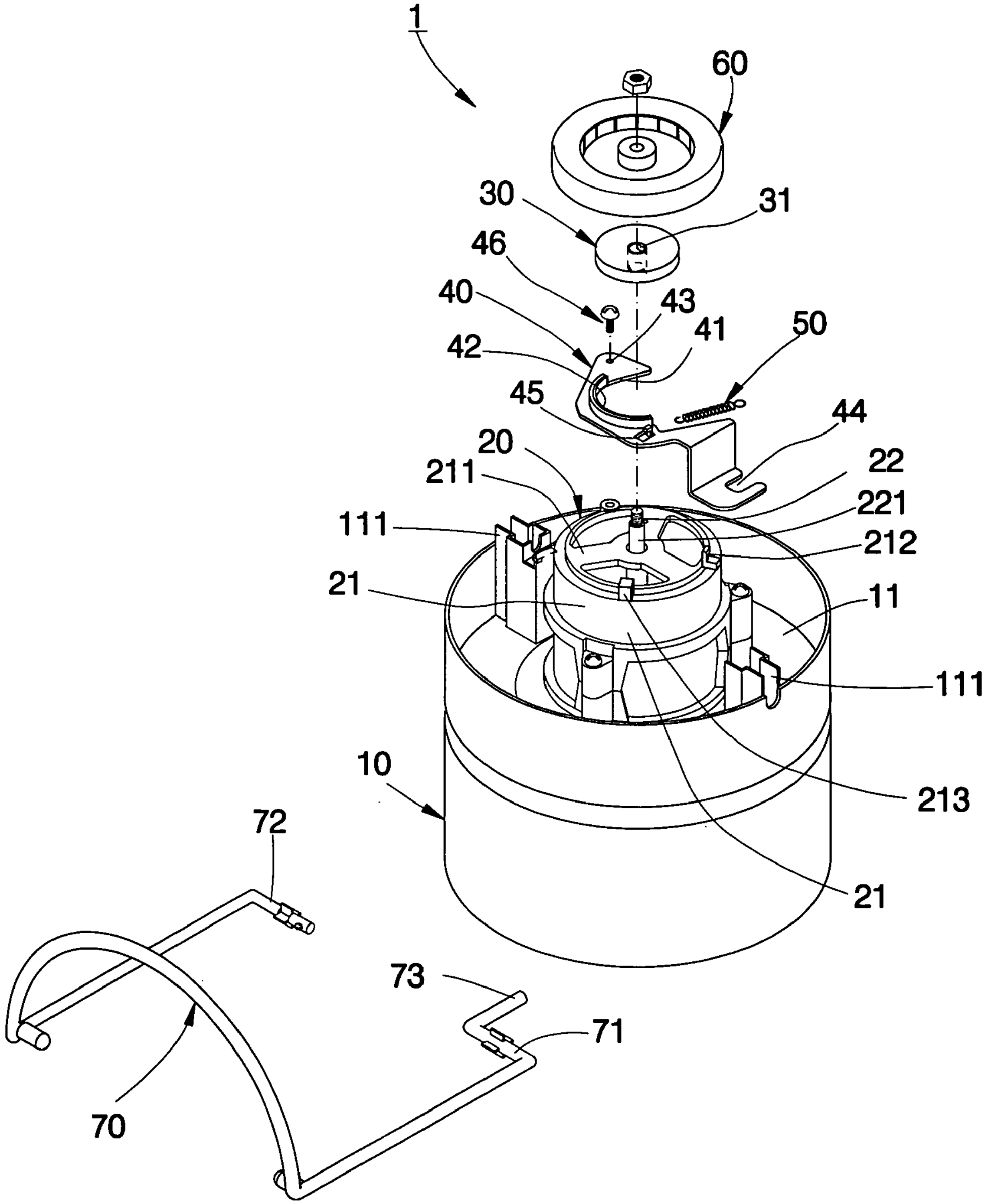
FIG. 1 is an exploded view of a first preferred embodiment of the present invention having its bottom side facing upwards.

Referring to FIG. 1, a juicer 1 constructed according to a first preferred embodiment of the present invention is comprised of a housing base 10, a motor 20, a circular block 30, a linkage 40, a springy member 50, a cooling fan 60, and an actuating member 70.

The housing base 10 is provided inside with a space 11 and two pivoting seats 111 located inside the space 11.

The motor 20 includes a shell 21 fastened to the housing base 10 inside the space 11 and located between the two pivoting seats 111, a rotary shaft 22 having two ends running through a top side and a bottom side 211 of the shell 21, a hook-like first lug 212 and a hook-like retaining member 213 formed respectively at two peripheral edges of the bottom side 211, and a sleeve portion 221 formed on the rotary shaft 22 and having a non-circular cross-section.

The circular block 30 includes an annular sidewall and an axial hole 31, which has a cross-section corresponding to that of the sleeve portion 221, being fitted onto the sleeve portion 221 of the rotary shaft 22 through the axial hole 31, such that the circular block 30 is synchronously rotatable with the rotary shaft 22.

Figure 2:
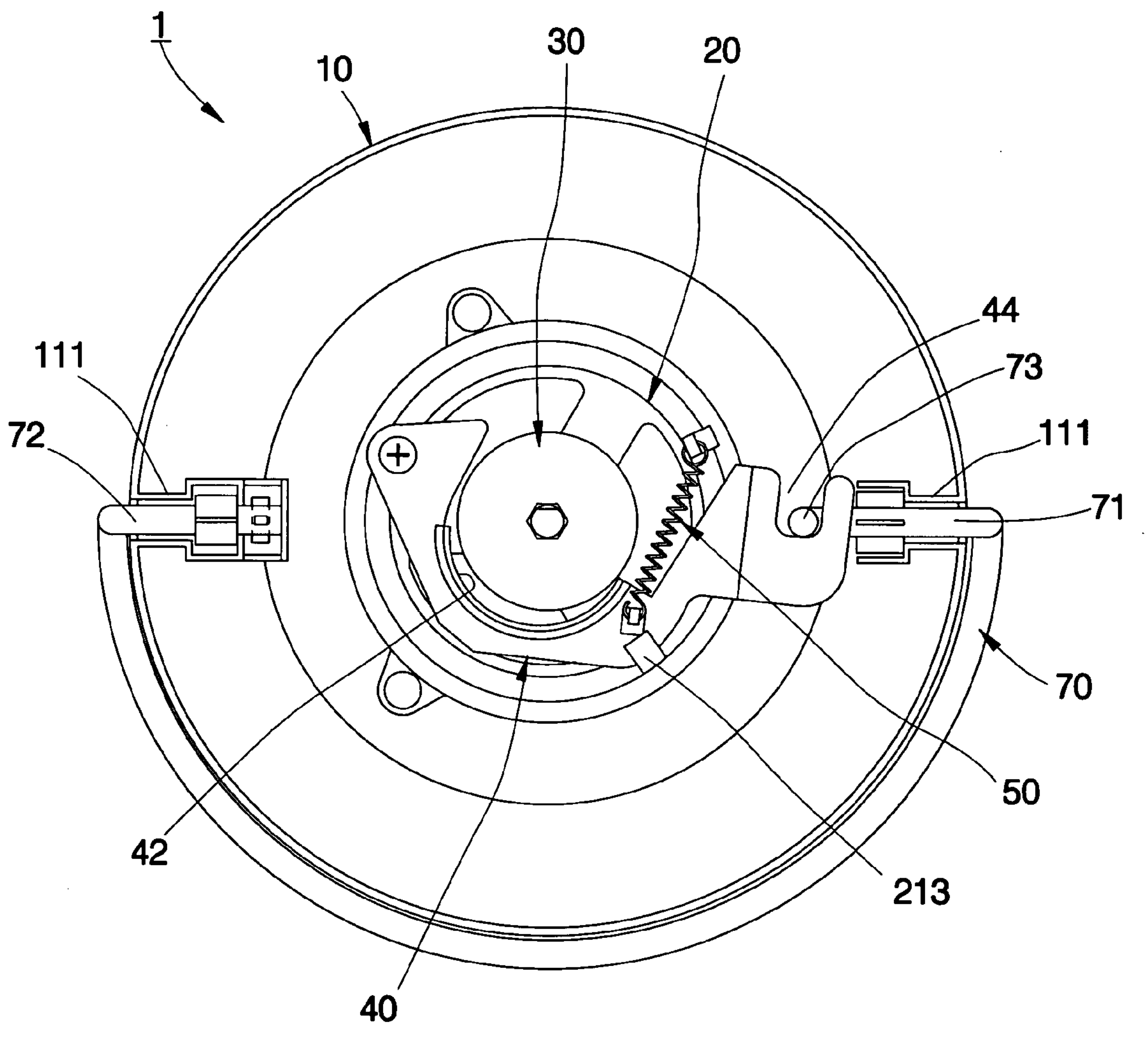
FIG. 2 is a bottom view of the first preferred embodiment of the present invention, showing that the actuating member is located at the first position.
Figure 3:
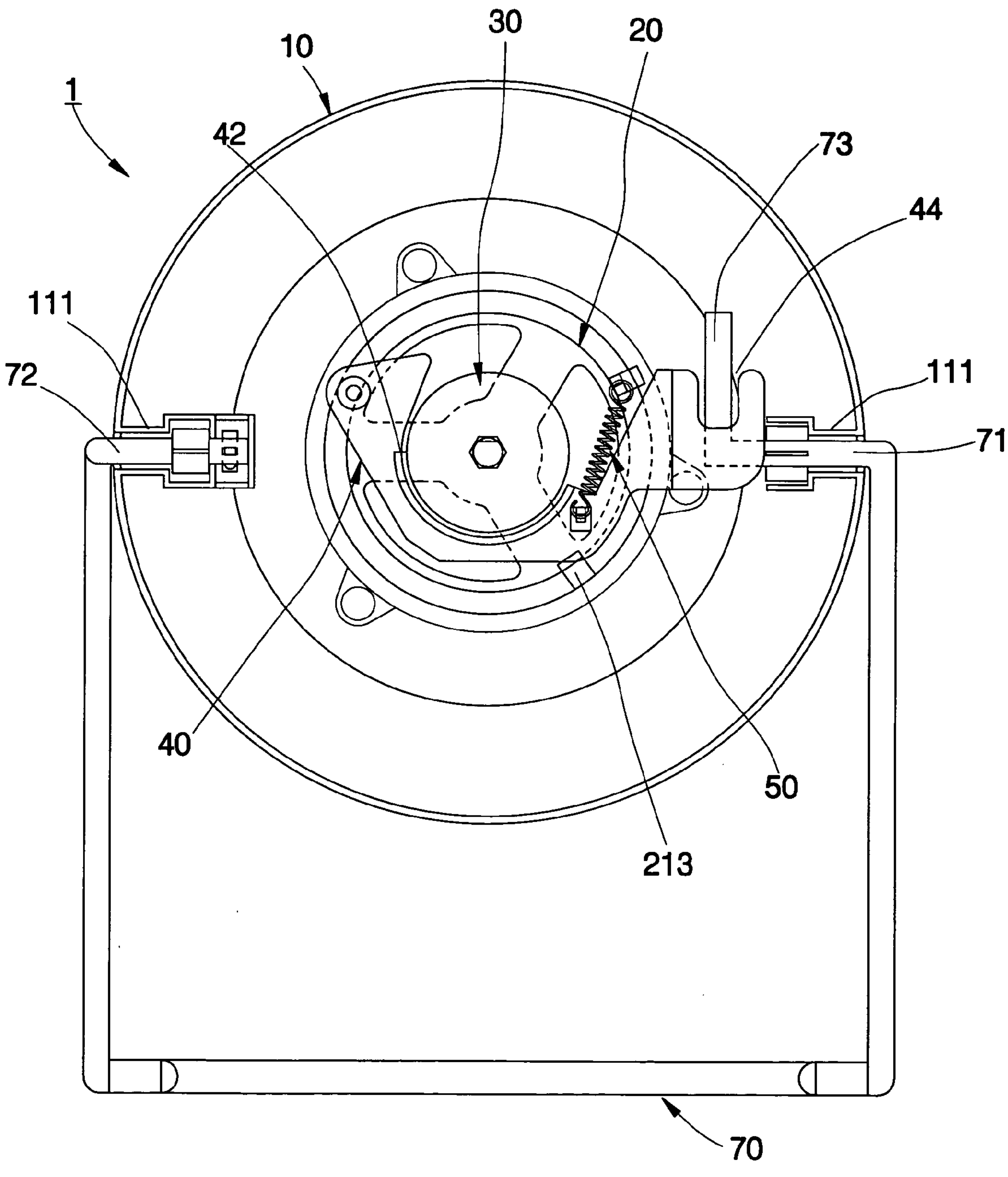
FIG. 3 is similar to FIG. 2, showing that the actuating member is located at the second position.

Referring to FIGS. 2 and 3, the linkage 40 is embodied as a sheety member, including an arched portion 41 recessed inwards from a side thereof and corresponding to the annular sidewall of the circular block 30 in shape, a corresponding arched braking piece 412 mounted on the arched portion 41 and facing the sidewall of the circular block 30, a pivot hole 43 formed at an end thereof, a driven portion 44 formed at the other end thereof, and a second lug 45 protruded at a side thereof. The linkage 40 is pivotally mounted to the bottom side 211 of the shell 21 of the motor 20 by bolt 46 inserted through the pivot hole 43 so as to pivot between a first position (FIG. 2) and a second position (FIG. 3). When the linkage 40 is located at the second position, the braking piece 42 is moved to frictionally engage against the peripheral sidewall of the circular block 30. In addition, the linkage 40 is located between the retaining member 213 and the bottom side 211 of the shell 21.

The springy member 50 is embodied as an extension spring, having two ends connected respectively with the second lug 45 of the linkage 40 and the first lug 212 of the shell 21, for generating resilience that drives the linkage 40 to pivot towards the second position.

Referring to FIG. 1 again, the cooling fan 60 is fastened to a free end of the rotary shaft 22 and located outside the circular block 30 for dissipating the heat generated in the motor 20.

The actuating member 70 is embodied as a U-shaped bar having two distal ends 71 and 72 extending respectively into the housing base 10 and is pivotally mounted to the pivoting seats 111 for pivotal movement relatively to the housing base 10. The actuating member 70 includes a driving portion 73 perpendicularly extending from one distal end 71 thereof for pushing the driven portion 44 of the linkage 40 upon the pivotal movement of the actuating member 70 to further drive the linkage 40 to be either securely positioned at the first position or away from the driven portion 44 to pivot to the second position by the springy member 50.

The operation for the juicer 1 of the present invention is recited below. When the driving portion 73 of the actuating member 70 is moved to contact against the driven portion 44 of the linkage 40, the linkage 49 is securely positioned at the first position and the braking piece 42 keeps spaced from the circular block 30; meanwhile, the circular block 30 is rotated synchronously with the rotary shaft 22. As soon as the driving portion 73 is moved away from the driven portion 44, the resilience of the springy member 50 drives the linkage 40 to be located at the second position, and the braking piece 42 frictionally engages against the circular block 30 in rotation, thereby braking and quickly stopping the rotary shaft 22 from rotation.

Therefore, in comparison with the conventional juicer, the circular block 30 has larger braking area for the braking piece 42 than the rotary shaft 22 in the present invention to enhance the friction and actuation between the braking piece 42 and the circular block 30, thereby stopping the rotation of the motor 20.

In addition, the retaining member 213 prevents the linkage 40 from one end thereof turnup or disengagement from the normal pivoting range. In other words, the braking piece 42 can securely contact against the circular block 30 to prevent the juicer 1 from brake failure.

Figure 4:
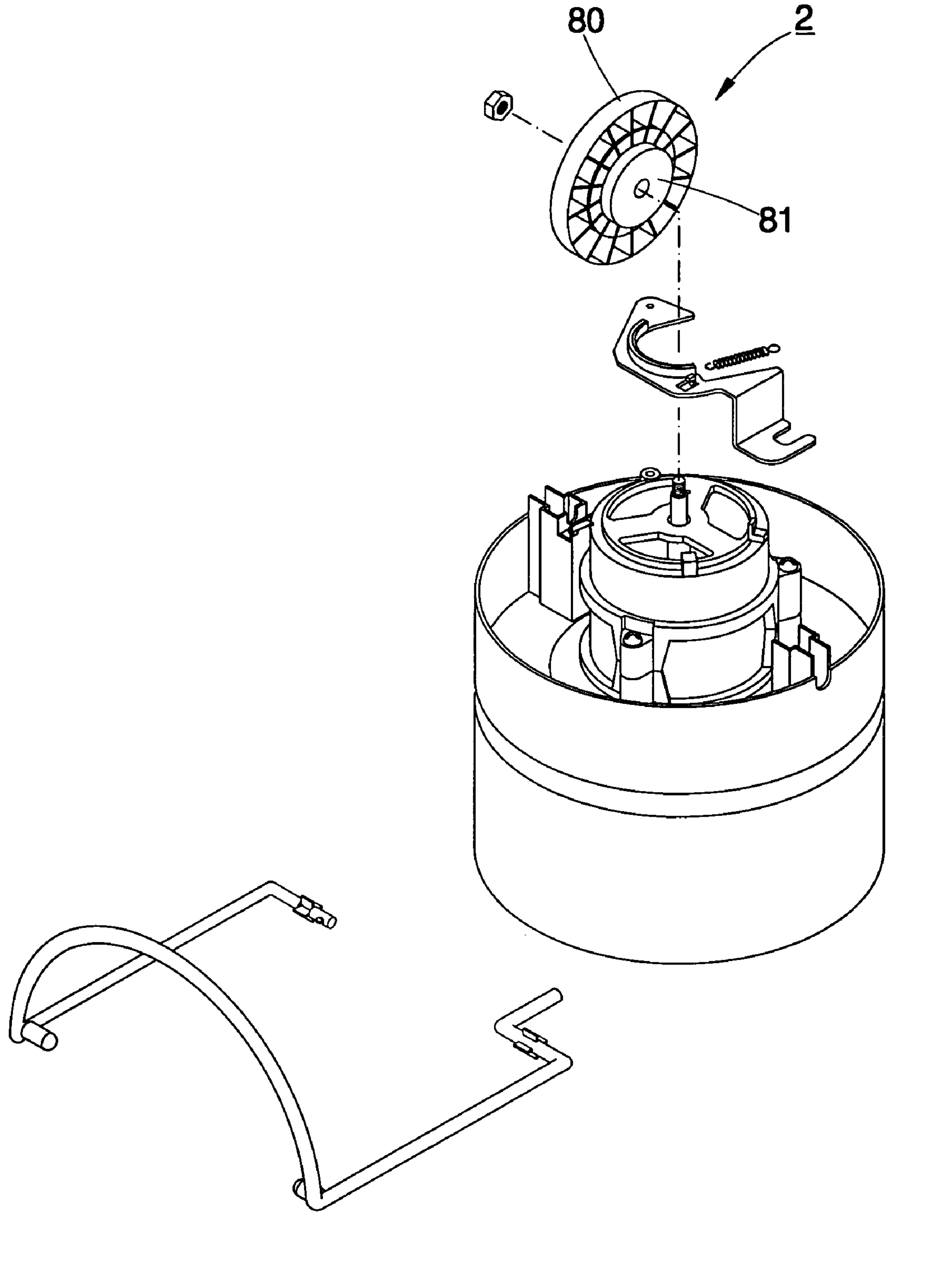
FIG. 4 is an exploded view of a second preferred embodiment of the present invention having its bottom side facing upwards.
Figure 5:
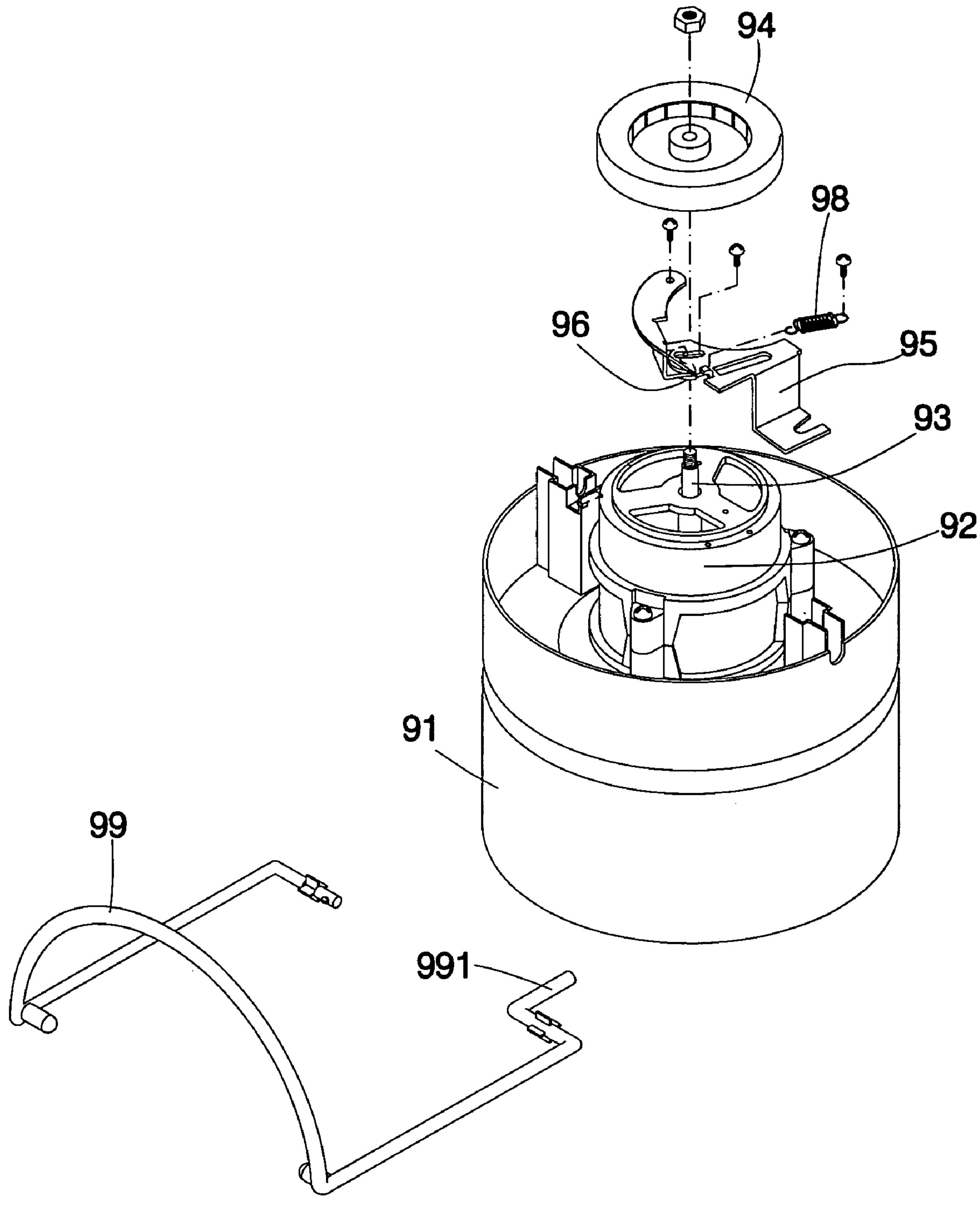
FIG. 5 is an exploded view of a second preferred embodiment of the present invention having its bottom side facing upwards.
Figure 6:
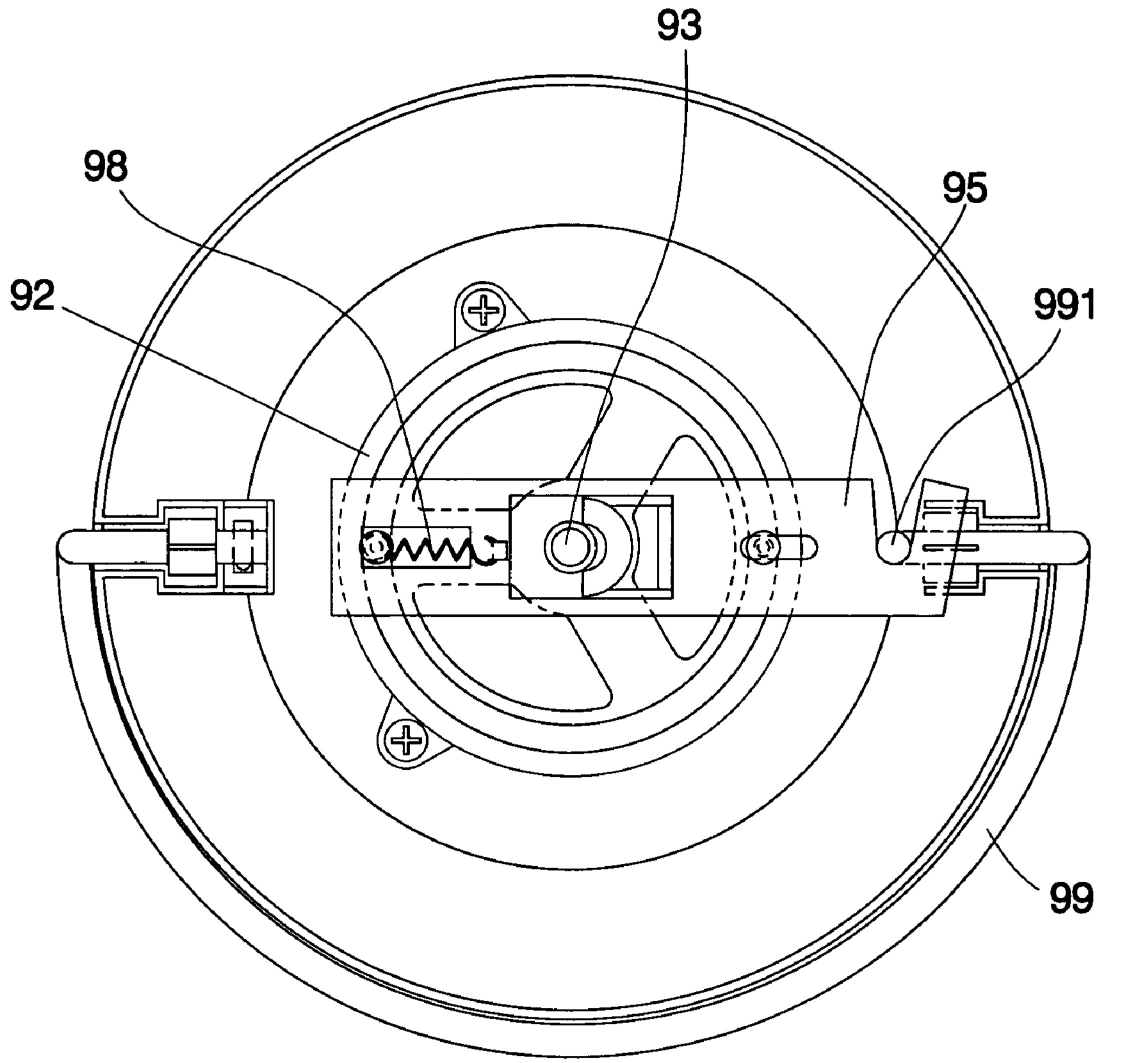
FIG. 6 is a bottom view of the conventional juicer.
Figure 7:
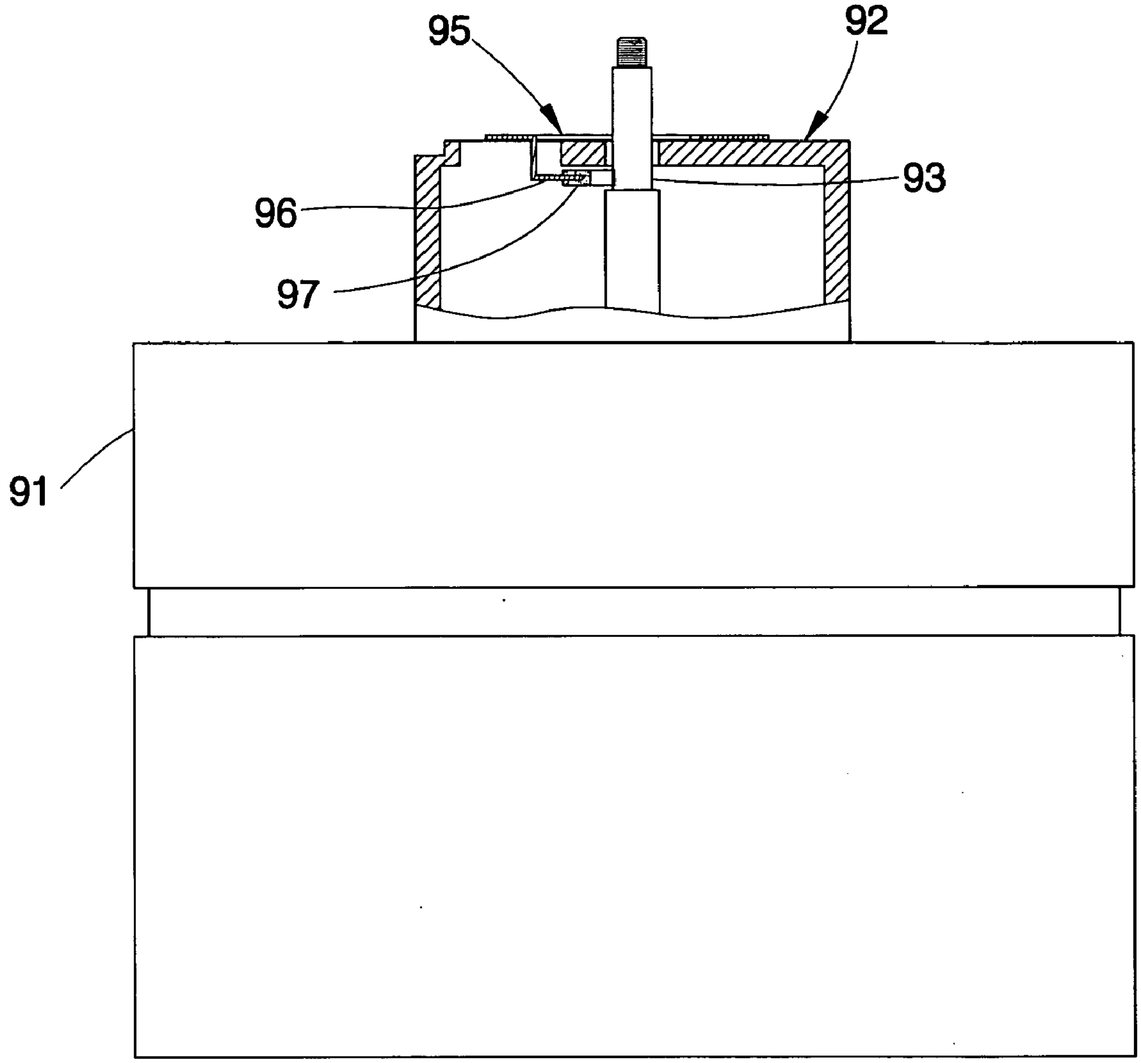
FIG. 7 is a side view of the conventional juicer.

Referring to FIG. 4, the juicer 2 constructed according to a second preferred embodiment of the present invention is similar to the first preferred embodiment but different by that the circular block 80 and the cooling fan 81 are formed in one piece by injection molding, thereby shortening the assembly time of the juicer 2 and further reducing the production cost of the same.

What is claimed is:

1. A juicer comprising:

a housing base having a space and at least one pivoting seat located inside said space;

a motor mounted inside said space of said housing base and having a shell and a rotary shaft, said rotary shaft having two ends running respectively through a top side and a bottom side of said shell;

a circular block having a peripheral sidewall and an axial hole, the block being mounted exteriorly of the shell on said rotary shaft for simultaneous rotation therewith;

a linkage pivotally mounted on the bottom side of said shell of said motor for pivotal movement between a first position and a second position, said linkage having an arch-shaped braking piece corresponding to the sidewall of the circular block and engageable therewith while said linkage is located at the second position;

a springy member having two ends connected respectively with said linkage and said shell of said motor for generating resilience that drives said linkage to pivot towards the second position; and an actuating member having a driving portion extending into said shell of said motor and pivotally mounted on said pivoting seat of said housing base for pivotal movement relatively to said shell, said driving portion engaging against said driven portion of said linkage to keep said linkage at the first position, whereby when said driving portion of said actuating member is forced to depart form said driven portion of said linkage, said linkage is driven by the resilience of said springy member to pivot towards the second position for braking said juicer.

2. The juicer as defined in claim 1, wherein said shell of said motor comprises a retaining member formed at the bottom side thereof; said linkage is located between said retaining member and the bottom side of said shell.

3. The juicer as defined in claim 2, wherein said retaining member is hook-like.

4. The juicer as defined in claim 1, wherein said rotary shaft of said motor comprises a sleeve portion having a non-circular cross-section; said axial hole of said circular block comprises a cross-section corresponding to that of said sleeve portion, whereby said circular block is fitted into said sleeve portion through said axial hole.

5. The juicer as defined in claim 1, wherein said shell of said motor comprises a first lug; said linkage comprises a second lug; said springy member is an extension spring having two ends connected respectively with said first lug and said second lug.

6. The juicer as defined in claim 1 further comprising a cooling fan, said cooling fan being fastened to a free end thereof and located outside said circular block.

7. The juicer as defined in claim 6, wherein said cooling fan is formed in one piece with said circular block by injection molding.

8. The juicer as defined in claim 1, wherein said linkage comprises an arched portion formed at a side thereof and corresponding to said circular block in shape; said braking piece is mounted on said arched portion of said linkage.

9. The juicer as defined in claim 1, wherein said housing base comprises two pivoting seats; said actuating member comprises two distal ends pivotally mounted respectively on said two pivoting seats; said driving portion vertically extends from said one distal end of said actuating member.

* * * * *